United States Patent [19]
Stiffler

[11] Patent Number: 5,864,657
[45] Date of Patent: Jan. 26, 1999

[54] MAIN MEMORY SYSTEM AND CHECKPOINTING PROTOCOL FOR FAULT-TOLERANT COMPUTER SYSTEM

[75] Inventor: Jack J. Stiffler, Hopkinton, Mass.

[73] Assignee: Texas Micro, Inc., Houston, Tex.

[21] Appl. No.: 564,021

[22] Filed: Nov. 29, 1995

[51] Int. Cl.[6] ...................................................... G06F 11/00
[52] U.S. Cl. .................................. 395/182.13; 395/182.1; 395/569; 711/135
[58] Field of Search ........................ 395/182.03, 182.04, 395/182.13, 182.15, 182.1, 182.11, 182.09, 182.14, 446, 468, 477, 569, 182.08; 364/285.2; 711/119, 135, 141, 150

[56] References Cited

U.S. PATENT DOCUMENTS

| | | | |
|---|---|---|---|
| 3,588,829 | 6/1971 | Boland | 340/172.5 |
| 3,736,566 | 5/1973 | Anderson et al. | 340/172.5 |

(List continued on next page.)

FOREIGN PATENT DOCUMENTS

| | | | |
|---|---|---|---|
| 0 143 125 A2 | 6/1985 | European Pat. Off. . | |
| 0 260 625 A1 | 3/1988 | European Pat. Off. . | |
| 0 288 511 | 1/1989 | European Pat. Off. | G06F 11/16 |
| 0 441 087 A1 | 8/1991 | European Pat. Off. | G06F 11/20 |
| 0457308 A2 | 11/1991 | European Pat. Off. | G06F 11/20 |
| 2028517 | 9/1970 | France . | |
| 2 606 184 | 5/1988 | France . | |
| 41 36 729 A1 | 5/1992 | Germany | G06F 12/08 |
| 55-41528 (A) | 3/1980 | Japan . | |
| 55-115121 (A) | 9/1980 | Japan . | |
| 58-31651 (A) | 2/1983 | Japan . | |
| WO 84/02409 | 6/1984 | WIPO | G06F 11/14 |

OTHER PUBLICATIONS

IEEE, vol. 4, No. 6, Dec. 1992, Incremental Recovery in Main Memory Database pp. 529–540, by Eliezer Levy, et al.

IEEE, No. 2, Feb. 1988, "Sequoia: A Fault–Tolerant Tightly Coupled Multiprocessor Transaction Processing," pp. 37–45, by Philip A. Berstein.

IEEE, Dec. 1991, Diffusion Model Based Task Remapping for Distributed Real—pp. 2–11, by Morikazu Takegaki, et al.

IBM Technical Disclosure Bulletin, vol. 36, No. 08, Aug. 1993, "Efficient Cache Access Through Compression," pp. 161–165.

Iacoponi, Hardware Asisted Real Time Rollback in the Advanced Fault Tolerant Data Processor, IEEE, 1991, 269–274.

IBM Technical Disclosure Bulletin, vol. 34, No. 10A, Mar. 1992, Memory Recovery Facility for Computer Systems; pp. 341–342.

(List continued on next page.)

*Primary Examiner*—Joseph Palys
*Attorney, Agent, or Firm*—Wolf, Greenfield & Sacks, P.C.

[57] ABSTRACT

A mechanism for maintaining a consistent, periodically updated state in main memory without constraining normal computer operation is provided, thereby enabling a computer system to recover from faults without loss of data or processing continuity. In a typical computer system, a processor and input/output elements are connected to a main memory subsystem. A checkpoint memory element, which may include one or more buffer memories and a shadow memory, is also appended to this main memory subsystem. During normal processing, an image of data written to primary memory is captured by the checkpoint memory element. When a new checkpoint is desired, thereby establishing a consistent state in main memory to which all executing applications can safely return following a fault, the data previously captured is used to establish that checkpoint. This structure and protocol can guarantee a consistent state in main memory, thus enabling fault-tolerant operation.

20 Claims, 8 Drawing Sheets

U.S. PATENT DOCUMENTS

| | | | |
|---|---|---|---|
| 3,761,881 | 9/1973 | Anderson et al. | 340/172.5 |
| 3,803,560 | 4/1974 | DeVoy et al. | 340/172.5 |
| 3,864,670 | 2/1975 | Inoue et al. | 395/182.1 |
| 3,889,237 | 6/1975 | Alferness et al. | 340/172.5 |
| 3,979,726 | 9/1976 | Lange et al. | 340/172.5 |
| 4,020,466 | 4/1977 | Cordi et al. | 340/172.5 |
| 4,044,337 | 8/1977 | Hicks et al. | 364/200 |
| 4,164,017 | 8/1979 | Randell et al. | 364/200 |
| 4,228,496 | 10/1980 | Katzman et al. | 364/200 |
| 4,373,179 | 2/1983 | Katsumata | 364/200 |
| 4,393,500 | 7/1983 | Imazeki et al. | 371/13 |
| 4,403,284 | 9/1983 | Sacarisen et al. | 364/200 |
| 4,413,327 | 11/1983 | Sabo et al. | 364/900 |
| 4,426,682 | 1/1984 | Riffe et al. | 364/200 |
| 4,435,762 | 3/1984 | Milligan et al. | 364/200 |
| 4,459,658 | 7/1984 | Gabbe et al. | 364/200 |
| 4,484,273 | 11/1984 | Stiffler et al. | 364/200 |
| 4,503,534 | 3/1985 | Budde et al. | 395/185.07 |
| 4,566,106 | 1/1986 | Check, Jr. | 371/67 |
| 4,590,554 | 5/1986 | Glazer et al. | 395/182.11 |
| 4,654,819 | 3/1987 | Stiffler et al. | 364/900 |
| 4,703,481 | 10/1987 | Fremont | 364/200 |
| 4,734,855 | 3/1988 | Banatre et al. | 364/200 |
| 4,740,969 | 4/1988 | Fremont | 371/12 |
| 4,751,639 | 6/1988 | Corcoran et al. | 364/200 |
| 4,817,091 | 3/1989 | Katzman et al. | 364/200 |
| 4,819,154 | 4/1989 | Stiffler et al. | 364/200 |
| 4,819,232 | 4/1989 | Krings | 371/9 |
| 4,823,261 | 4/1989 | Bank et al. | 364/200 |
| 4,905,196 | 2/1990 | Kirrmann | 365/200 |
| 4,912,707 | 3/1990 | Kogge et al. | 395/182.15 |
| 4,924,466 | 5/1990 | Gregor et al. | 371/12 |
| 4,941,087 | 7/1990 | Kap | 364/200 |
| 4,958,273 | 9/1990 | Anderson et al. | 364/200 |
| 4,959,774 | 9/1990 | Davis | 395/182.04 |
| 4,964,126 | 10/1990 | Musicus et al. | 371/36 |
| 4,965,719 | 10/1990 | Shoens et al. | 364/200 |
| 4,996,687 | 2/1991 | Hess et al. | 371/10.1 |
| 5,123,099 | 6/1992 | Shibata et al. | 395/425 |
| 5,157,663 | 10/1992 | Major et al. | 371/9.1 |
| 5,214,652 | 5/1993 | Sutton | 371/9.1 |
| 5,235,700 | 8/1993 | Alaiwan et al. | 395/575 |
| 5,239,637 | 8/1993 | Davis . | |
| 5,247,618 | 9/1993 | Davis . | |
| 5,263,144 | 11/1993 | Zurawski et al. | 395/425 |
| 5,269,017 | 12/1993 | Hayden et al. | 395/575 |
| 5,271,013 | 12/1993 | Gleeson | 395/575 |
| 5,276,848 | 1/1994 | Gallagher et al. | 395/425 |
| 5,293,613 | 3/1994 | Hayden et al. | 395/182.13 |
| 5,301,309 | 4/1994 | Sugano | 395/575 |
| 5,313,647 | 5/1994 | Kaufman et al. | 395/700 |
| 5,325,517 | 6/1994 | Baker et al. | 395/575 |
| 5,325,519 | 6/1994 | Long et al. | 395/575 |
| 5,327,532 | 7/1994 | Ainsworth et al. | 395/200 |
| 5,363,503 | 11/1994 | Gleeson | 395/575 |
| 5,369,757 | 11/1994 | Spiro et al. | 395/575 |
| 5,381,544 | 1/1995 | Okazawa et al. | 395/575 |
| 5,394,542 | 2/1995 | Frey et al. | 395/575 |
| 5,398,331 | 3/1995 | Huang et al. | 395/182.1 |
| 5,408,636 | 4/1995 | Santeler et al. | 395/425 |
| 5,408,649 | 4/1995 | Beshears et al. | 395/575 |
| 5,418,916 | 5/1995 | Hall et al. | 395/375 |
| 5,418,940 | 5/1995 | Mohan | 395/575 |
| 5,420,996 | 5/1995 | Aoyagi | 395/425 |
| 5,463,733 | 10/1995 | Forman et al. | 395/182.08 |
| 5,485,585 | 1/1996 | Huynh et al. | 395/311 |
| 5,488,716 | 1/1996 | Schneider et al. | 395/182.08 |
| 5,488,719 | 1/1996 | Schultz . | |
| 5,495,587 | 2/1996 | Comfort et al. | 395/375 |
| 5,495,590 | 2/1996 | Comfort et al. | 395/375 |
| 5,504,861 | 4/1996 | Crockett et al. | 395/182.11 |
| 5,530,801 | 6/1996 | Kobayashi | 395/182.11 |
| 5,530,946 | 6/1996 | Bouvier et al. | 395/182.21 |
| 5,557,735 | 9/1996 | Pinkston, II et al. | 395/180 |
| 5,566,297 | 10/1996 | Devarakonda et al. | 395/182.13 |
| 5,568,380 | 10/1996 | Brodnax et al. | 364/184 |
| 5,574,874 | 11/1996 | Jones et al. | 395/376 |
| 5,583,987 | 12/1996 | Kobayashi et al. | 395/182.11 |
| 5,630,047 | 5/1997 | Wang | 395/182.13 |
| 5,644,742 | 7/1997 | Shen et al. | 395/591 |
| 5,649,136 | 7/1997 | Shen et al. | 395/591 |
| 5,649,152 | 7/1997 | Ohran et al. | 395/441 |

OTHER PUBLICATIONS

M. Banatre, A. Gefflaut, C. Morin, "Scalable Shared Memory Multi–Processors: Some Ideas to Make Them Reliable", in *Hardware and Software Architectures for Fault Tolerence,* Springer–Verlag, 1994 Lecture Notes in Computer Science, presented after Jun. 10, 1993.

N.Bowen and D.Pradhan, "Processor–and Memory–Based Checkpoint and Rollback Recovery," 1993 IEEE Transactions on Computers, pp. 22–30.

Y.Lee and K.Shin, "Rollback Propagation Detection and Performance Evaluation of FTMR$^2$M—A Fault Tolerant Multiprocessor," 1982 IEEE Transactions on Computers, pp. 171–180.

C. Kubiak et al., "Penelope: A Recovery Mechanism for Transient Hardware Failures and Software Errors," 1982 IEEE Transactions on Computers, pp. 127–133.

A.Feridun and K.Shin, "A Fault–Tolerant Multiprocessor System with Rollback Recovery Capabilities," 1981 IEEE Transactions on Computers, pp. 283–298.

P.Lee et al., "A Recovery Cache for the PDP–11," IEEE Transactions on Computers, vol. C–29, No. 6, Jun. 1980, pp. 546–549.

MAIN MEMORY SYSTEM AND CHECKPOINTING PROTOCOL FOR FAULT-TOLERANT COMPUTER SYSTEM

FIELD OF THE INVENTION

The present invention is related to computer memory systems and checkpointing protocols, particularly for fault tolerant computer systems.

BACKGROUND OF THE INVENTION

Fault tolerance in computers is generally realized in either of two ways: either through a hardware-intensive technique called masking, or a software-based approach called checkpointing. Masking is achieved by replicating hardware and executing computer programs on several independent units in parallel. The outputs of these units are then compared to determine their validity. In the simplest and oldest embodiment of this technique, three complete computers are implemented and a simple majority vote on their outputs is used to determine the "correct" output. If at least two of the computers are functioning properly and the voter system itself is also working correctly, the potentially incorrect output of the malfunctioning computer is outvoted and the correct answer is indeed presented to the user. While there are other embodiments of masking that are somewhat more efficient, masking systems generally suffer from the significantly increased cost of the hardware that must be added to mask out the effect of a faulty component. In addition, masking protects only against hardware faults; a software bug that causes one unit to malfunction will also cause other units running the same software to malfunction in the same way. All outputs will contain the same error which as a result will, as a result, pass undetected.

The alternative technique called checkpointing has the potential of providing tolerance to faults in a considerably more cost-effective way. This technique requires that the state of the entire computer be periodically recorded at time intervals designated as checkpoints. A fault may be detected by either a hardware fault monitor (e.g., by a decoder operating on data encoded using an error detecting code, by a temperature or voltage sensor, or by one device monitoring another identical device) or by a software fault monitor (e.g., an assertion executed as part of the executing code that checks for out-of-range conditions on stack pointers or addresses into a data structure). If a fault is detected, recovery involves first diagnosing and circumventing a malfunctioning unit, if possible, and then returning the system to the last checkpoint and resuming normal operation from that point.

Recovery is possible if sufficient hardware remains operational after any elements identified as faulty during the recovery process have been circumvented. In a multiprocessor system, for example, the system can continue to operate as long as at least one of the processors continues to function. Similarly, a system that can remap memory or redirect I/O through alternate ports can survive the loss of memory or I/O resources as well. Moreover, most faults encountered in a computer system are transient or intermittent in nature, exhibiting themselves as momentary glitches. It is therefore generally possible to recover from such faults without circumventing any hardware. However, since transient and intermittent faults can, like permanent faults, corrupt the data that is being manipulated at the time of the fault, it is necessary to have a consistent state to which the computer can return following such events. This is the purpose of the periodic checkpointed state.

Since checkpoints are typically established every 50 milliseconds or so, rolling an executing program back to its last checkpoint is generally entirely transparent to a user. If handled properly, all applications can be resumed from their last checkpoints with no loss of continuity and no contamination of data.

There are two primary advantages to checkpointing relative to masking. First, checkpointing is considerably less expensive to implement. Second, checkpointing offers protection against software as well as hardware faults. The first advantage simply reflects the fact that checkpointing does not require massive replication of hardware. The second advantage is a consequence of the fact that most software bugs remaining in well tested, mature software are exposed only in exceptional situations. Were this not true, the bugs would have been found and removed during normal testing. Such exceptional situations are generally caused by some asynchronous event such as an interrupt that forces program execution to follow a sequence that would not otherwise have been followed. If the system is forced to roll back to a consistent state and continue forward, that is, if the software bug is treated like a hardware transient, it is highly unlikely that the system will encounter exactly the same exception in exactly the same state as before. Consequently, it is highly unlikely that it will encounter the same bug a second time.

Checkpointing also suffers from two potential disadvantages relative to masking. First, masking generally results in instantaneous or near-instantaneous recovery from faults. Any resulting errors are simply masked, so no explicit recovery is necessary. Checkpointing requires that certain software routines be executed to diagnose the problem and to circumvent any permanently malfunctioning component of the computer. As a consequence, the resulting recovery time, typically on the order of one second, may preclude the use of this technique for achieving fault tolerance for some real-time applications where response times on the order of milliseconds or less are required. In applications in which humans directly interact with the computer, e.g., in transaction processing applications; however, a momentary interruption of a second or so is entirely acceptable and, in fact, is generally not even perceptible. Thus, this potential disadvantage of checkpointing is not relevant to that class of applications.

Second, checkpointing has traditionally been achieved at the application level. Thus, the application programmer has been required to be concerned about what data has to be checkpointed, and when it should be done. This requirement places a serious burden on the programmer and has seriously impeded the widespread use of checkpointing as a means for achieving fault tolerance.

More recently, techniques have been developed that allow checkpointing to be done at the system software level so that the application programmer need not be concerned with attempting to identify the data that has to be checkpointed or even be aware that checkpointing is taking place. For this to be possible, the system itself must be able to establish periodic checkpoints, regardless of the applications that it might be running. U.S. Pat. Nos. 4,654,819 and 4,819,154 to Stiffler describe a computer system capable of doing exactly that. The system accomplishes this kind of checkpointing by requiring each of its processors to retain all modified data in its local cache until it is time to establish a new checkpoint at which time all modified data is flushed out to main memory. Such caches are sometimes called blocking caches. Prior to flushing its blocking cache, a processor does a context switch during which it places the contents of its internal registers, including its program counter, on a stack which is flushed out with all the other modified data. Consequently, memory is updated all at once with data that is internally consistent, thereby establishing a checkpoint to which the system can safely return should it subsequently suffer a fault. To guarantee the ability to survive both main memory faults and faults experienced during the flushing operation itself, memory is duplicated, with each data item stored in both a primary location and a shadow location.

While this technique does accomplish its goal of establishing checkpoints without burdening the application programmer, it does have certain disadvantages due to its dependence on the use of a blocking cache. Since a processor cannot write any cache line back to main memory unless it writes back all currently modified lines at the same time, any cache overflow or any request by one processor for data held in another processor's cache requires the processor releasing the data to flush its entire cache. This requirement precludes the use of standard cache coherency protocols (for example, the protocol described in U.S. Pat. No. 5,276,848 to Gallagher) and creates potential porting and performance problems when programs are executed that rely on such standard protocols.

Other methods for capturing data for checkpointing purposes have been proposed, for example, by Kirrmann (U.S. Pat. No. 4,905,196) and by Lee et al. ("A Recovery Cache for the PDP-11", IEEE Trans. on Computers, June, 1980). Kirrmann's method involves a cascade of memory storage elements consisting of a main memory, followed by two archival memories, each of the same size as the main memory. Writes to the main memory are also written by the processor into a write buffer. When it is time to establish a checkpoint, the buffered data is then copied by the processor first to one of the archival memories and then to the second, although techniques are also described that eliminate the need for one of the copies. The two archival memories ensure that at least one of them contains a valid checkpoint, even if a fault occurs while a buffer-to-memory copy is in progress. Some problems with this architecture include a triplication of memory, the use of slow memory for the archival memory and the effect on processor performance since the three memory elements are different ports on the same bus.

The paper by Lee et al. discusses a method for saving data in a recovery cache before updated data is written to memory, for all memory locations falling within an application-specified range of addresses. This method involves converting all writes to memory within the range specified by the application into read-before-write operations. If a fault occurs during the execution of the application, the contents of the recovery cache are stored back into main memory, thereby restoring it to the state that it was when the application began its current execution. One problem with this method is that it slows the host system due to interference with memory cycles by the read-then-write operations which are required. It also requires checkpointing to be handled or considered by the application programmer.

Other techniques have been developed to establish mirroring of data on disks rather than in main memory. Since disk access is orders of magnitude slower than main memory access, such schemes have been limited to mirroring data files, that is, to providing a backup to disk files should the primary access path to those files be disabled by a fault. No attempt is made to retain program continuity or to recover the running applications transparently to the users of the system. In some cases, it is not even possible to guarantee that mirrored files are consistent with each other, only that they are consistent with other copies of the same file. U.S. Pat. No. 5,247,618 discloses one example of such a scheme.

SUMMARY OF THE INVENTION

Embodiments of the present invention provide a device and process for maintaining, in a computer system, a consistent, periodically updated checkpoint state in the computer system's main memory while allowing the use of conventional cache coherency protocols and non-blocking caches. Embodiments of the invention provide a main memory which is accessed through one or more logical ports in which a primary memory element and a checkpoint memory element are both coupled to the same logical port. The primary and checkpoint memory elements may be connected to the same physical port or distinct physical ports. The primary memory element is accessed in the same way as a standard main memory. The checkpoint memory element captures accesses, i.e., writes and/or reads, to the main memory which are detectable because the checkpoint memory element is connected to the same port as the primary memory element. Access may come from a processor, an I/O device or other device in the computer system. The checkpoint memory element may be a physically separate memory module from the primary memory element, or the checkpoint memory element and the primary memory element may reside within the same memory module at different addresses. The captured accesses are then used to ensure the existence of a consistent checkpoint state in the main memory. Such a computer system with the appropriate detection and circumvention procedures can recover from faults without loss of data integrity or processing continuity.

In a typical computer system, a processor and input/output elements are connected to a main memory. The connection is typically provided by one or more memory buses, cross-point switches or other interconnection mechanisms. In all cases, the main memory has one or more logical ports through which all accesses to the main memory are made. In one embodiment of the present invention disclosed herein, the standard main memory, hereafter called the primary memory, is augmented with a buffer memory (typically a first-in, first-out memory) connected to the same logical port(s), and a second memory element (typically a random-access memory), equal in storage capacity to the primary memory element, also connected to the same port(s) and to the buffer memory. The buffer memory and the second memory, also called a shadow memory, define a checkpoint memory element. During normal processing, data written to the primary memory element is also simultaneously captured by the buffer memory. When a checkpoint is desired, thereby establishing a consistent state in main memory to which all executing applications can safely return following a fault, the data previously captured in the buffer memory is then copied to the shadow memory.

In a system in accordance with this invention, input and output (I/O) operations are normally handled in the following manner. During normal operations, I/O requests are made in any standard way, and are entered on an appropriate I/O queue by the operating system. However, the actual physical I/O operation is not initiated until the next checkpoint. Thus, in the event of a fault and a subsequent rollback to a checkpointed state, all pending I/O operations are also checkpointed. Disk and other idempotent I/O operations, i.e., operations that can be repeated without changing the result, can simply be restarted.

The appropriate disposition of communications I/O activities depends upon the communication protocol. For those protocols that accommodate the possible duplication of messages, the pending I/O can be restarted. For those protocols that handle dropped messages, the I/O can be deleted from the pending queue. For those protocols that do not handle either dropped messages or repeated messages, the pending I/O is deleted from the pending queue. If the message was not actually sent before the fault, or was aborted as a result of the fault, the effect is the same as a transient communication link failure with the same consequences to the application or to the user. Since communication link interruptions are generally considerably more common than computer faults, the use of a protocol that cannot make such events transparent presumably means that the user or the application is prepared to cope with them in any event.

The mechanisms described herein can guarantee the existence of a consistent checkpoint state from which the computer can resume operation following a fault, thus supporting fault-tolerant computer system operation.

BRIEF DESCRIPTION OF THE DRAWINGS

For a better understanding of the present invention, reference is made to the drawings which are incorporated herein by reference and in which.

DETAILED DESCRIPTION

The present invention will be more completely understood through the following detailed description which should be read in conjunction with the attached drawings in which similar reference numbers indicate similar structures. Reference is made to Applicant's co-pending U.S. patent application Ser. No. 08/258,165, filed Jun. 10, 1994, which is incorporated herein by reference.

Figure 1:
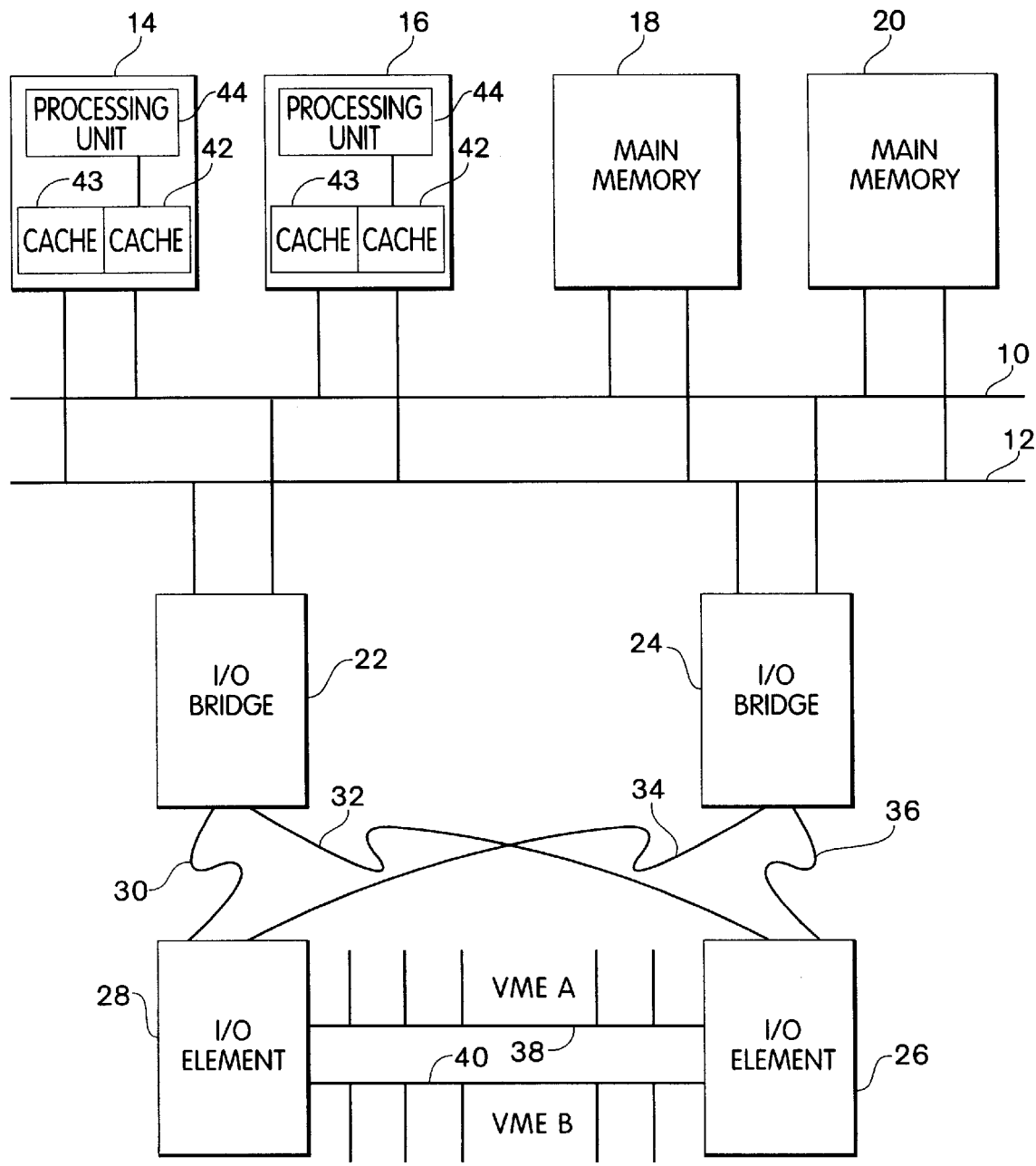
FIG. 1 is a block diagram of a computer system which uses a main memory structure of one embodiment of the present invention.

FIG. 1 is a block diagram of a computer system 11 with which the invention generally may be used. One or more processing elements 14 and 16 are connected to one or more main memory systems 18 and 20 via interconnection mechanisms 10 and 12 such as a bus or crosspoint switch. One or more input/output (I/O) subsystems 22 and 24 are also connected to the interconnection mechanism 10 (12). Each I/O subsystem comprises an input/output (I/O) element or bridge 26 (28) and one or more buses 30 and 32 (34 and 36). An I/O element 26 (28) may also be connected to any standard I/O bus 38 (40), such as a VME bus. For ease of description, only one of each of these systems and subsystems is referred to below.

Figure 2:
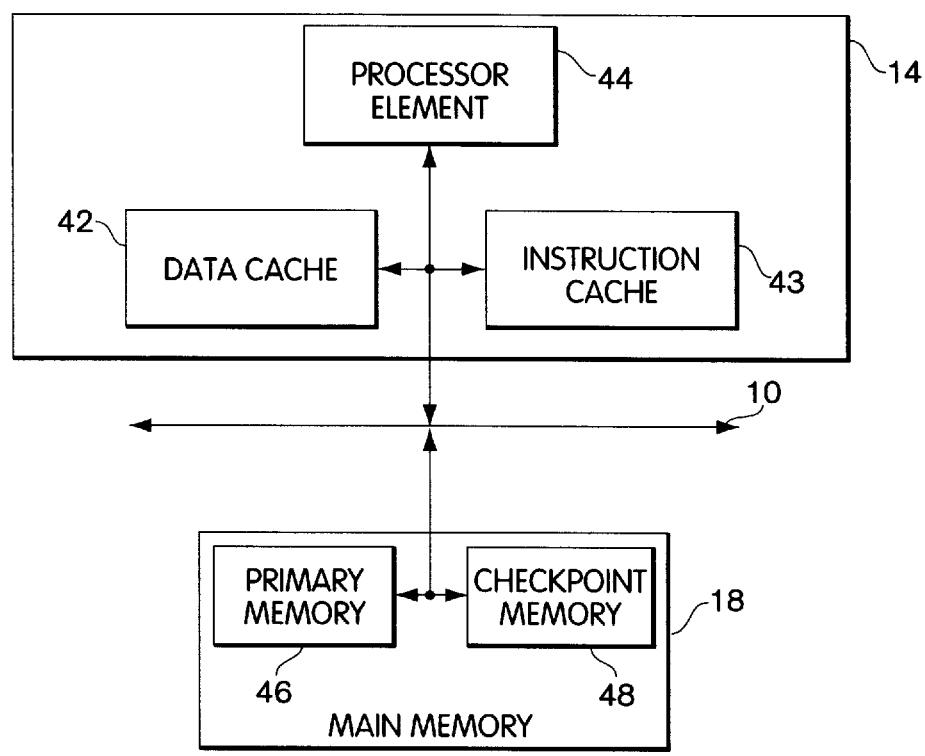
FIG. 2 is a block diagram illustrating in more detail a processing unit with a cache and a checkpointed main memory according to one embodiment of the present invention.

As shown in FIG. 2, each processing element, e.g., 14, includes a processing unit 44 connected to a cache 42. This connection also connects the processing unit 44 and the cache 42 to the interconnection mechanism 10. The processing unit 44 may be any standard microprocessor unit (MPU). For example, the PENTIUM microprocessor, available from Intel Corporation, is suitable for this purpose. The processing unit 44 operates in accordance with any suitable operating system, as is conventional. A processing element 14 may include dual processing units 44 for self-checking purposes.

The cache 42 is either a write-through or a write-back type of cache and has an arbitrary size and associativity and may consist of more than one cache level in a hierarchical structure. The processing unit 44 may store in the cache 42 either data only or both computer program instructions and data. In the former case, an additional similar instruction cache 43 may be connected to the processing unit 44 for the processing unit 44 to store computer program instructions. This connection also connects the instruction cache 43 to the interconnection mechanism 10. If this system is a multiprocessing computer system, each processing unit 44 may use any conventional mechanism to maintain cache coherency, such as bus snooping.

The cache 42 is connected to a main memory system, e.g., 18, via interconnection mechanism 10. The main memory system includes a primary memory element (PME) 46 and a checkpoint memory element (CME) 48 which are interconnected and connected to interconnection mechanism 10. The CME 48 must have at least the capacity of the PME 46, but both may have arbitrary capacities.

Figure 3:
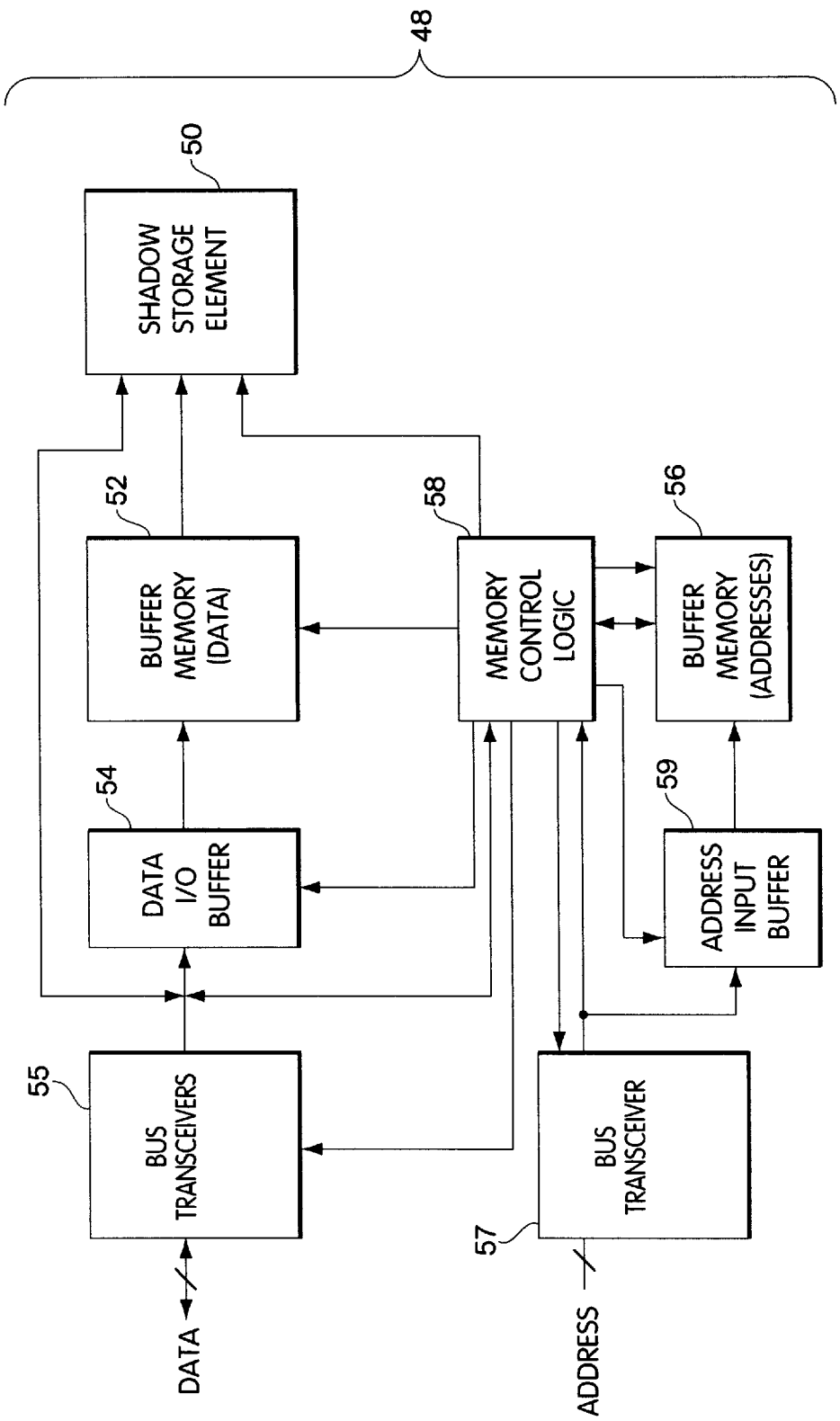
FIG. 3 is a more detailed block diagram of the shadow memory shown in FIG. 2.

The CME 48, as shown in FIG. 3, includes buffer memories 52 and 56 which are preferably first-in, first out (FIFO) buffers and a shadow storage element 50 called the shadow memory, each having data inputs, data outputs and control inputs including access control and address inputs. The FIFO buffer memories and the shadow memory element are typically implemented with dynamic, volatile, random-access memories (DRAMs), in the form of integrated circuits, typically, single in-line memory modules (SIMMs).

A bus transceiver 55 connects the inputs of a data input buffer 54 and data outputs of the shadow memory 50 to interconnection mechanism 10. Outputs of the data input buffer 54 are connected to the data inputs of buffer memory 52 and the data inputs of the shadow memory 50. The data outputs of the buffer memory 52 are also connected to the data inputs of the shadow memory 50.

Memory control logic 58 has control outputs which are connected to control inputs of each of the buffer memory 52, the shadow memory 50, the data input buffer 54 and the bus transceiver 55 to control the flow of data among those elements, in a manner that is described below. Memory control logic 58 also has data paths connected to interconnection mechanism 10 through the bus transceiver 55, a first address input connected to the address portion of interconnection mechanism 10 via bus transceiver 57 and a second address input connected to the data outputs of an address buffer memory 56. The address buffer memory 56 is also connected to outputs of an address input buffer 59, of which inputs are connected to the address portion of interconnection mechanism 10 via bus transceiver 57. Both bus transceiver 57 and address input buffer 59 have a control input connected to the memory control logic 58. The memory control logic 58 also controls storage in the address buffer memory 56 of addresses which correspond to data stored in the buffer memory 52, in a manner that is described below.

The non-memory logic elements may be implemented using conventional circuitry, custom or semi-custom integrated circuits or programmable gate arrays. Since it may be advantageous to keep the number of module types to a minimum, the PME's 46 may also have the same structure as the CME's 48. The buffer memory 52 in a memory element used as a PME 46 may store computer program instructions or read-only data which does not have to be shadowed. The memory control logic 58 in a memory element is preferably designed to enable the memory element to be either a PME or a CME on command from the operating system. The buffer memory 52 should be large enough to capture all data modified between any pair of consecutive checkpoints. Given the process described below for using this system, the total capacity of all of the buffer memories 52 combined in computer system 11 should preferably be (at least) of the order of the combined capacity of the caches 42 in the computer system 11.

Figure 4:
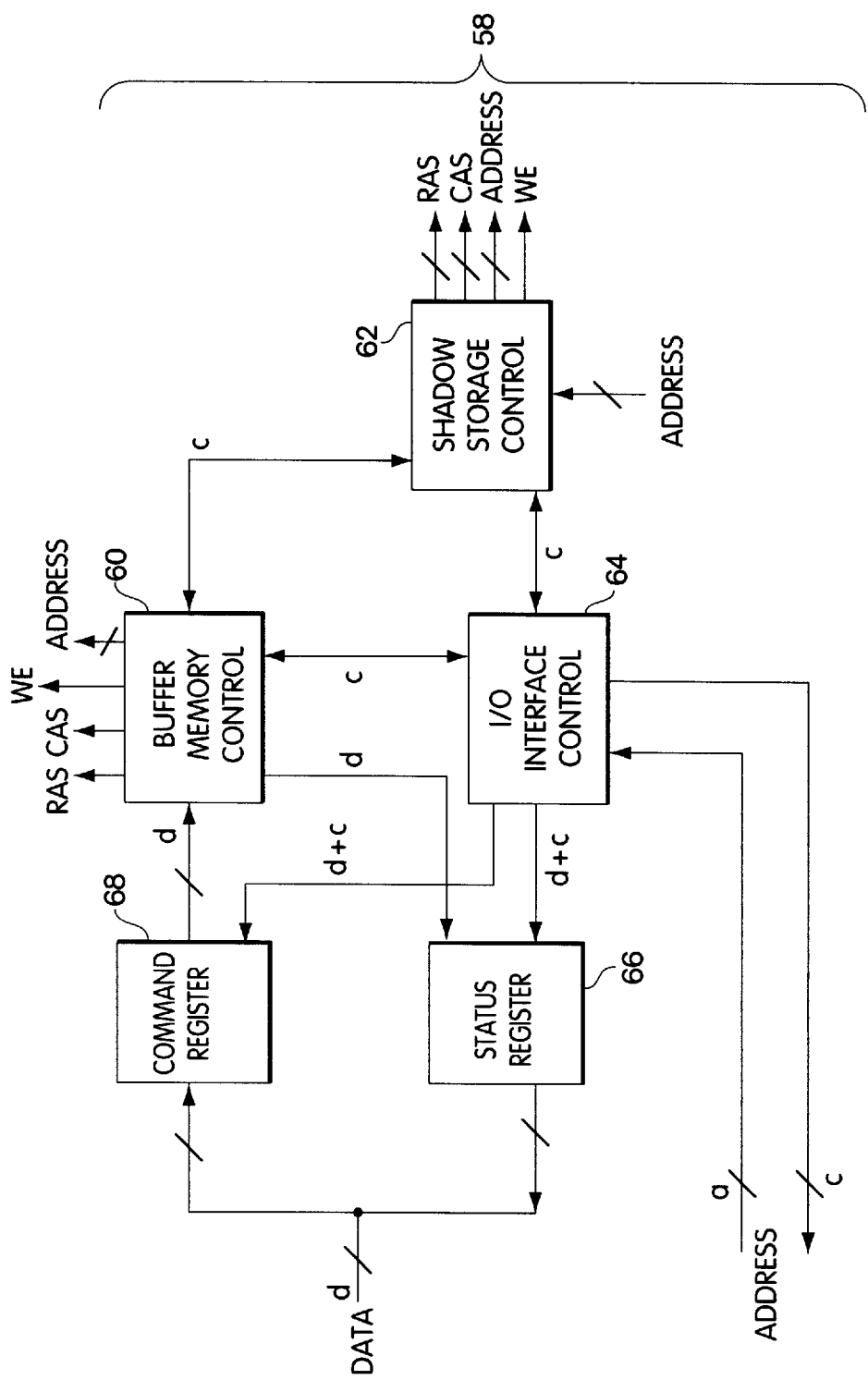
FIG. 4 is a more detailed block diagram of the memory control logic shown in FIG. 3.

The memory control logic 58 is illustrated in more detail in FIG. 4. It includes a command register 68 which has data input connected to interconnection mechanism 10 via the bus transceiver 55. A status register 66 has an output also connected to the interconnection mechanism 10 via bus transceiver 55. Buffer memory control circuit 60 and shadow storage control circuit 62 provide the row address strobe (RAS), column address strobe (CAS), row and column addresses and write enable (WE) control signals to the buffer memory 52 and shadow memory 50, respectively. Control circuits 60 and 62 also have connections for coordinating data transfer between buffer memory 52 and shadow memory 50 using addresses stored in buffer memory 56. Buffer memory control circuit 60 has outputs connected to the input of the status register 66 to indicate how full the buffer memory 52 is and whether copying from the buffer memory 52 to shadow memory 50 is complete. Buffer memory control circuit 60 also has an input connected to the output of command register 68 which indicates whether it should copy data between the buffer memory 52 and the shadow memory 50. The command register also indicates whether the memory element is acting as a primary memory element or a checkpoint memory element. An I/O interface control 64 controls the flow of information through the status register 66 and command register 68, and coordinates data transfers through the bus transceivers 55 and 57 with the buffer memory control circuit 60 and checkpoint storage control circuit 62. The I/O interface control 64 also accepts inputs from the address portion of interconnection mechanism 10, so as to recognize addresses to the command and status registers and to the main memory system itself.

The process of using this system to maintain a consistent state in main memory following a fault will now be described. In contrast to systems such as in U.S. Pat. No. 4,654,819, this process allows data to be passed from one processing element 14 to another processing element 16 without requiring the entire cache 42 of processing unit 14 to be flushed. If all processing units 44 in the computer system 11 have access to all buses or communication paths to the main memories, each processing unit 44 may use conventional bus snooping methods to assure cache coherency. If all processing units 44 do not have access to all system buses, the processing units 44 may use other well-known cache coherency techniques instead.

The buffer memory 52 in each checkpoint memory element 48 allows periodically updated checkpoints to be maintained in the main memory system 18 so that a consistent system state can be restored in the event of a fault. All data lines that are stored in the primary memory element 46 are also stored in the buffer memory 52, along with their corresponding memory (physical) addresses which are stored in the associated address buffer memory 56 in the checkpoint memory element 48. The protocol also applies to lines written to the primary memory element 46 when a cache 42 is flushed by the operating system using either specially designed flushing hardware or conventional cache flushing processor instructions. Flushing operations by the processing units 44 are synchronized. When all processing units 44 have completed their flush, the operating system instructs the checkpoint memory element 48, using command register 68, to copy, the contents of the buffer memory element 52 into its shadow memory element 50 using checkpoint storage control circuit 62. To checkpoint a consistent system state, once a processing element 14 has begun a flush, it cannot resume normal operation until all other processing elements 14 have completed their flushes, except under certain conditions discussed below.

Processor cache flushing is synchronized because the buffer memory needs to know which data should be copied to the shadow memory element 50, and which data should not. That is, the buffer memory needs to distinguish between post-flush and pre-flush data. Thus, if the buffer does not know what processor is sending data, all processors must complete their flushes before normal operation can begin in order to maintain consistency. Synchronization is preferably controlled using a test-and-set lock or equivalent operation using a designated location in main memory 18, such as indicated at 80 in FIG. 5, to store the lock value. To ensure that it is possible to recover from primary memory element failures as well as other failures, this designated location is preferably implemented as part of the status register in the checkpoint memory element. A failure in the checkpoint memory element does not disrupt normal operation. Consequently, this data structure is not needed in this event.

Figure 6A:
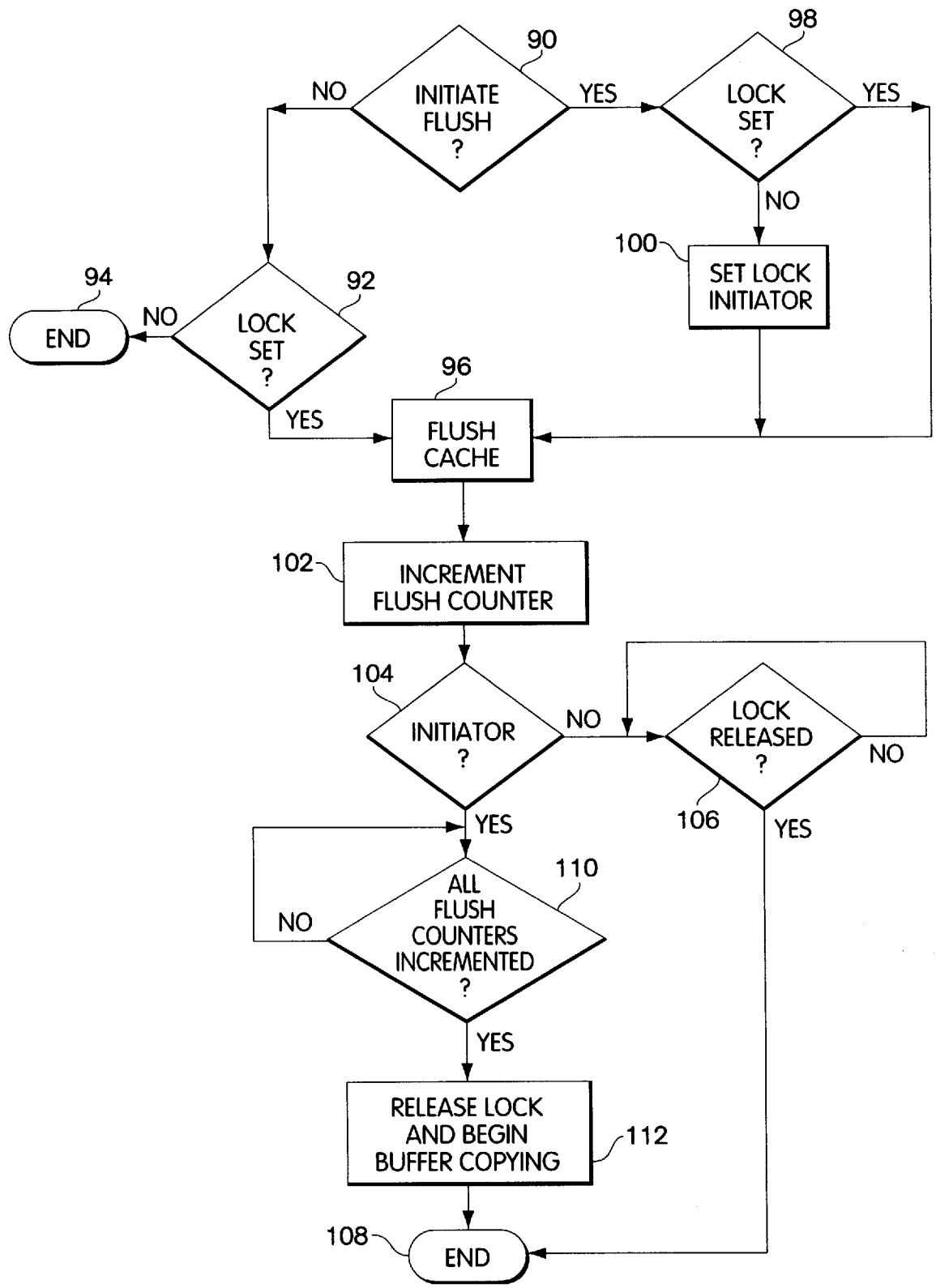
FIG. 6A is a flowchart describing how each processing unit controls flushing of its cache to maintain main memory consistency.

At periodic intervals, each processing unit 44 determines whether it should initiate a flush operation as indicated at step 90 in FIG. 6A. The processing unit 44 can make this determination in a number of different ways. For example, one or more bits in the status register 66 of the checkpoint memory element 48 could be used to indicate the remaining capacity of the buffer memory 52. If the buffer memory 52 is too full, a processing unit 44 initiates a flush. Also, a flush may be initiated after a fixed period of time has elapsed.

If this processing unit 44 does not need to initiate a flush, then it examines the designated memory location 80 to determine whether another processing unit 44 has already set the lock (step 92). If the lock is not set, this process ends as indicated at 94. Otherwise, if the lock is set, this processing unit 44 flushes its cache 42 in step 96. The effect of the flushing operation is to store all lines in the cache (or preferably only those lines that have been modified since the last flush) to the primary memory element 46, and, because of the aforementioned properties of the checkpoint memory element 48, to the buffer memory 52 of the checkpoint memory element 48 as well. Prior to the actual flushing operation, the processing unit 44 saves its state in the cache 42 so that this information is flushed as well.

Input and output (I/O) operations are normally handled in the following manner. During normal operations, I/O requests are made in any standard way, and are entered on an appropriate I/O queue by the operating system. However, the actual physical I/O operation is not initiated until the next checkpoint. Thus, in the event of a fault and a subsequent rollback to a checkpointed state, all pending I/O operations are also checkpointed. Disk and other idempotent I/O operations, i.e., operations that can be repeated without changing the result, can simply be restarted.

The appropriate disposition of communications I/O activities depends upon the communication protocol. For those protocols that accommodate the possible duplication of messages, the pending I/O can be restarted. For those protocols that handle dropped messages, the I/O can be deleted from the pending queue. For those protocols that do not handle either dropped messages or repeated messages, the pending I/O is deleted from the pending queue. If the message was not actually sent before the fault, or was aborted as a result of the fault, the effect is the same as a transient communication link failure with the same consequences to the application or to the user. Since communication link interruptions are generally considerably more common than computer faults, the use of a protocol that cannot make such events transparent presumably means that the user or the application is prepared to cope with them in any event.

If the processing unit 44 determines in step 90 that it should initiate a flush, it then determines whether the lock is already set in step 98, similar to step 92. If the lock is already set, the processing unit 44 continues by flushing its cache 42 in step 96. Otherwise, it sets the lock in step 100, sends a message to the other processors to trigger their flush line operations thereby identifying itself as the initiator of the flush, before flushing its cache 42.

Figure 5:
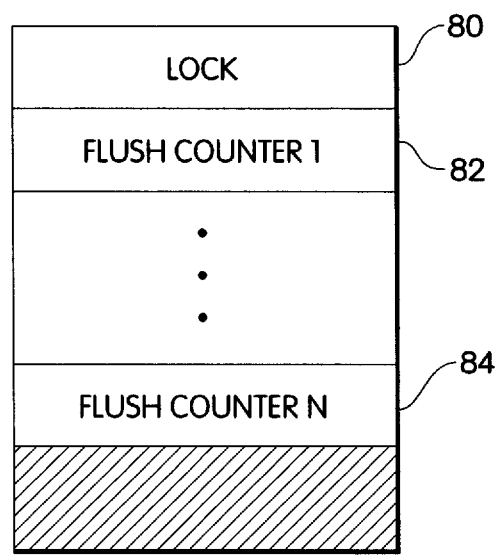
FIG. 5 is a diagram of memory locations used by the processing units to maintain main memory consistency.

After a processing unit 44 flushes its cache 42 in step 96, it increments its corresponding flush counter in step 102. As indicated in FIG. 5, each processing unit 44 has a flush counter, such as shown at 82 and 84, which are predetermined designated locations in main memory 18. After the flush counter (e.g., 82) is incremented, the processing unit 44 determines whether it is the initiator of this flush sequence (step 104). If it is not the initiator, it then waits until the lock is released in step 106. When the lock is released, this process ends in step 108 and the processing unit 44 may resume normal operations.

If the processing unit 44 is the initiator of the flush as determined in step 104, it then waits until all flush counters (82–84) are incremented in step 105. Once all flush counters have been incremented, this processing unit 44 sends a commit command to the checkpoint memory element, thereby instructing the checkpoint memory element 48 to begin copying data in the buffer memory 52 into the shadow memory 50, by sending a command to the command register 68, and releases the lock (step 107). Receipt of the command notifies the checkpoint memory that element 48 that the flush has completed and causes the buffer memory control 60 in conjunction with the shadow memory control 62 to move the data that was stored in the buffer memory 52 prior to the receipt of the notification into the appropriate locations (as determined by the corresponding physical address stored in address buffer memory 56) in the shadow memory 50. Once this command has been sent, the flush lock is released and the processing units 44 can resume normal processing. The loops around steps 106 and 110 should have time-out protection which triggers fault recovery procedures, in the event of a failure during flushing operations.

Note that the flush counters described here may be 1-bit counters and hence can also readily be implemented as part of the status register in the checkpoint memory element. The bits can be set individually by each processor and then automatically reset when the initiator sends the commit command thereby instructing the checkpoint memory element to begin the copy from its buffer to the shadow memory.

The buffer memory control 60 needs to distinguish between pre-flush and post-flush data if normal operation is to be allowed while the pre-flush contents of the buffer are being moved into the shadow memory. The buffer memory control can make this distinction, for example, by recording the last address of buffer memory 52 in which data is stored at the end of each synchronized flushing operation. There are other ways to identify such a boundary, for example by counting how much data has been written to buffer memory 52 prior to the commit command. All data stored in buffer memory 52 following the last cache line stored during the previous flush up through the last cache line stored during the current flush is pre-checkpoint data. Any data stored after that is post-checkpoint data which is not copied to the shadow memory element 50 at that time. Any post-checkpoint data can be placed in any area of the buffer memory 52 which is unoccupied or has already been copied to the shadow storage element.

These operations ensure the existence of a consistent state in main memory 18 to which the computer system 11 can safely return following a fault. If the fault is transient, the system can simply roll back to the last checkpoint and resume normal operation. If the fault is permanent, the system first reconfigures itself to circumvent the failed element, if possible, e.g., by eliminating a defective microprocessor in a multiprocessor system, or by switching dual-ported I/O devices to circumvent a defective I/O channel. The system then rolls back to the last checkpoint. If the fault affects any portion of the computer system 11 other than the checkpoint memory element 48 itself, the checkpoint memory element 48 contains the state of the entire system in main memory 18 at the point in time following the last completed flush and the system can resume operation from that state following reconfiguration around the failed element. If data was being moved from the buffer memory 52 to the shadow memory element 50 at the time of the fault, this operation has to be completed before normal processing can resume.

Copying the contents of the checkpoint memory element to the primary memory can be time consuming in systems having large amounts of memory. If this copying is done during recovery, the recovery time can be considerably prolonged by this activity. If, instead, the checkpoint memory element takes over the role of the primary memory element, then the system is vulnerable to a second fault, since now there is no way of establishing further checkpoints. This vulnerability is necessary if the primary memory has in fact failed. But in the majority of cases, and, in particular, when the fault is transient, the primary memory is still functional and this vulnerability could be avoided. Avoiding this vulnerability to a second fault is, in fact, particularly desirable in the case of a transient fault since such faults often repeat themselves until the malfunctioning component can be identified and isolated.

One method for reducing the recovery time involves switching to the checkpoint memory element during recovery, by remapping memory so that accesses go to the checkpoint memory element, and then resynchronizing the primary memory as a background task. This narrows the period in which there is vulnerability to a second fault but does not eliminate this period. If the effect of the background memory synchronization task on performance is to be contained, the resynchronization may, in fact, take an extended period of time.

A preferable method for mitigating this problem involves enhancing the control logic in the checkpoint memory element to enable the control logic to copy from the shadow memory to the primary memory only the locations that have been modified since the last checkpoint. Since the buffer memory in the checkpoint memory element contains the address of every location that has been modified since the last checkpoint, and since those locations have not yet been modified in the shadow, this action will restore the primary memory to its state at the last checkpoint. Thus the primary memory can be restored by copying at most the number of lines that could be stored in the buffer memory (typically of the order of 16 megabytes) rather than the number of lines in the entire memory (typically of the order of several hundred megabytes). This reduces copying time to a fraction of a second, allowing it to be done during recovery without unduly prolonging the total recovery time.

Figure 7:
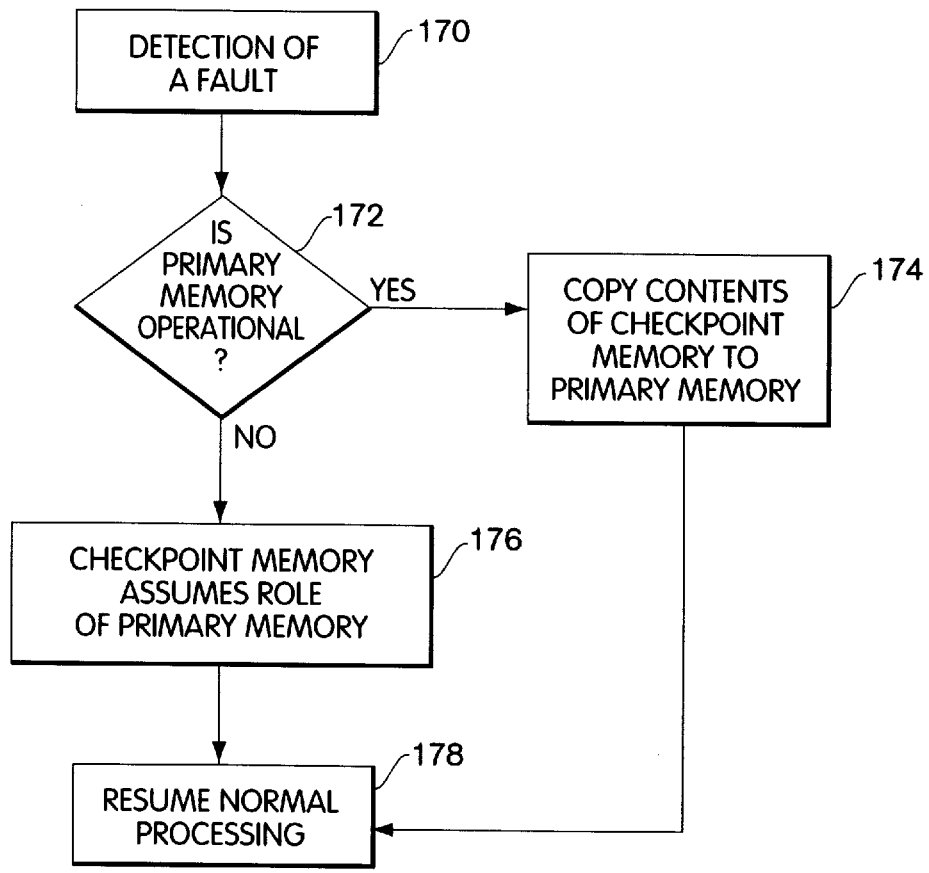
FIG. 7 is a flowchart describing how the computer system of one embodiment of the invention recovers from a fault.

Since, as part of the flushing operation, each processing unit 44 stores the processing state that existed at the time that the flush was initiated, all running tasks have been saved in a consistent state in main memory 18. The procedure for recovering from a fault is shown in FIG. 7. Following detection of a fault (step 170), the contents of the checkpoint memory element 48 can either be copied to the corresponding primary memory element 46, if it is still operational (steps 172, and 174), or the checkpoint memory element 48 can take over the role of the primary memory element 46 (step 176). In either event, normal processing can resume from that saved state (step 178).

If the fault was in the checkpoint memory element 48 itself, then the remainder of the computer system 11 is unaffected. The only consequence is that the computer system 11 no longer has the ability to recover if a second fault should occur before the checkpoint memory element 48 is repaired.

Overflow of a buffer memory 52 is also not fatal. The contents of the associated checkpoint memory element 48 can always be restored by copying the contents of its associated primary memory element 46. Since the system may not be able to recover from a fault during this interval, however, it is important that the probability of such an overflow be kept to a minimum.

This checkpointing protocol allows data to be written to a primary memory element 46 at any time. Consequently, a single cache line, or portion thereof, can be written to a primary memory element 46 without forcing the entire cache 42 to be flushed, thereby relaxing the requirement for a large, associative cache. Further, data can be passed from cache 42 of one processing unit 44 to cache 42 of another processing unit 44 so long as it is simultaneously updated in the primary memory element 46 and in the buffer memory 52 in the checkpoint memory element 48. Significant performance advantages can be obtained using this protocol in a multiprocessing system in which shared data is frequently passed from the processing element (e.g., 14) to another processing element (e.g., 16).

If a standard bus protocol is used to implement this process, a checkpoint memory element 48 remains passive so far as the interconnection mechanism (i.e., bus) 10 is concerned. It simply stores in its buffer memory 52 all data written to its corresponding primary memory element 46. In order for the checkpoint memory element 48 to accept data synchronously with the primary memory element 46, the data input buffer 54 temporarily stores the data because a line may be in the process of being copied from the buffer memory 52 to the shadow memory 50 at the time of the write or a memory refresh may be underway.

Some performance advantage can be gained if certain non-standard bus protocols are also implemented. For example, if the bus protocol allows the checkpoint memory element 48 to distinguish between processing elements 14, or at least to identify whether a line being stored has been written by a processing element 14 that has completed its ith flush or is still executing its ith flush, or at least to distinguish pre-flush from post-flush data, a processing element 14 does not have to wait until all other processing elements have completed their flushes before it resumes normal operation. In this case, consistency is maintained in main memory by requiring a processing element 14 to suspend normal operation after completing its ith flush only until all other processing elements 16 have also at least begun (but not necessarily completed) their ith flushes.

Figure 6B:
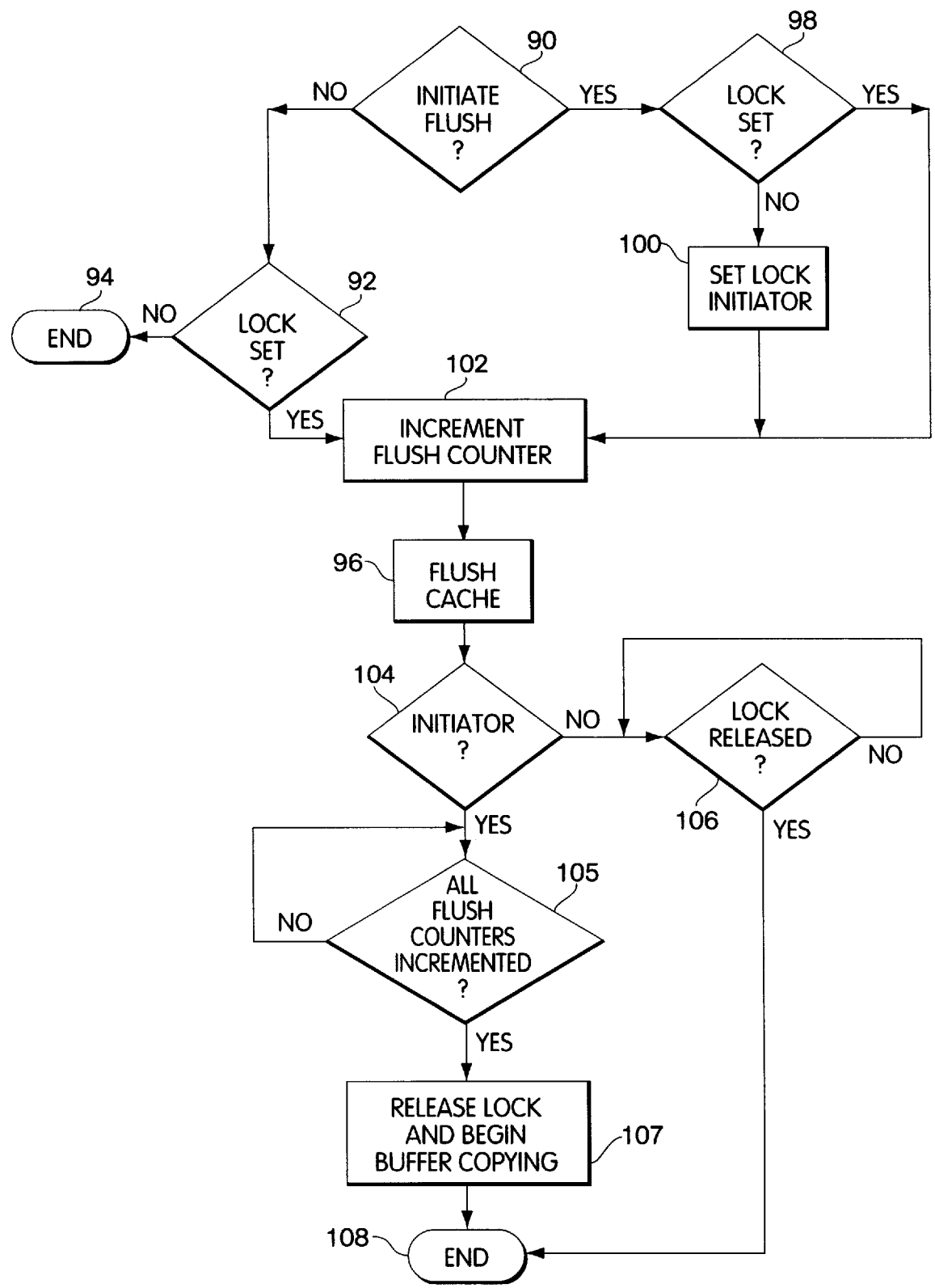
FIG. 6B is a flowchart describing an alternate method by which each processing unit controls flushing of its cache to main memory.

This relaxed synchronization restriction still ensures the existence of a consistent checkpoint state. That is, it guarantees that a processing element 16 that has not begun its flush does not receive post-flush modified data from another processing element 14 that has completed its flush and resumed normal processing. This less restrictive synchronization protocol can be allowed if the logic associated with the buffer memory 52, perhaps using the bus protocol, can distinguish between data that is being written as part of the flushing operation (and hence must be stored in the part of the buffer memory 52 that is to be stored to the shadow storage element 50 as soon as all processing elements 14 have completed their flushes) and data that is being written by a processing element 14 that has completed its flush (and hence is not to be transferred to shadow memory 50 until the next flush is completed). To implement this kind of cache flushing synchronization, the order and placement of steps 96 and 102 in FIG. 6A may be reversed as shown in FIG. 6B.

Other non-standard bus protocol features, while also not necessary to ensure a consistent state in main memory, can be introduced to decrease recovery times following a fault by reducing memory-to-memory copy time. Two such features are the ability to support "dual-write" and "copy" memory access modes. If a line is stored in dual-write mode, the primary memory element 46 stores the line in the normal way and the checkpoint memory element 48 stores the line directly in the shadow memory 50. (Thus, the checkpoint memory element 48 does not store this data in the associated buffer memory 52). In copy mode, the primary memory element 46 sources the addressed line and the checkpoint memory element 48 stores the resulting data to the corresponding location in the shadow memory 50.

It may also be useful to provide the capability for a memory element to operate in a "phantom mode" in which it acts like a primary memory element for accesses over some designated range of addresses, but like a checkpoint memory for all other addresses. This mode allows the computer system 11 to operate with some PMEs 46 shadowed and others unshadowed. Such a feature may be useful, for example, when a portion of the primary memory has failed and no replacement is immediately available, but the remainder of primary memory is still functioning normally.

In embodiments of the present invention described above, individual elements, including processors, memories, and I/O devices, of computer systems have been described as being interconnected by one or more memory buses. It should be understood that the memory buses may be replaced by other interconnecting mechanisms for transferring data, such as a cross-point switch, to accomplish the same function.

One advantage of the present invention over prior checkpointing systems is that checkpoints can be established without placing special requirements on the underlying computer platform. Thus, it is compatible with virtually any standard computer platform and can be incorporated into any such platform with little modification to that platform. Neither application programs nor users need to be involved with, or even be aware of, the checkpointing process. Additionally, this checkpointing system requires only duplication, rather than triplication, of the storage capacity of the primary memory. Very fast recovery is supported and protection against memory failures and other hardware and software faults is provided. Moreover, embodiments of the present invention offer a significant level of fault tolerance by providing a means of recovering from both memory faults and other faults in the system.

Given the embodiments of the invention described here, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A computer system which periodically establishes a consistent checkpoint of a current state of the computer system for supporting fault-tolerant operation, the computer system comprising:
   a processor having a cache, internal registers and an input/output subsystem which provides input/output events for the processor and connected to a main memory system, wherein the processor has means for queuing input/output events between checkpoints;
   wherein the main memory system includes:
   i) a primary memory element;
   ii) a buffer memory element connected to the primary memory element such that data and addresses of write accesses to the primary memory element are captured in the buffer memory element simultaneously with the write access to the primary memory element;
   iii) a shadow storage element connected to the buffer memory;
   iv) means for copying data from the buffer memory element to the shadow storage element in response to an instruction to perform such copying from the processor; and
   wherein the processor includes means for suspending operations, means for flushing the cache, internal registers and the queued input/output events to the main memory system and means for instructing the means for copying after flushing of the cache, internal registers and queued input/output events has completed.

2. A memory system for use with at least two processors, each connected to the memory system and having a cache of arbitrary size, internal registers and a queue of input/output events, wherein the cache, internal registers and queue of each processor are periodically flushed by the processors in synchronization, comprising:
   a primary memory element;
   a buffer memory physically disjoint from and connected to the primary memory such that data and addresses of write accesses to the primary memory element are captured in the buffer memory element simultaneously with the write access to the primary memory element;
   a shadow storage element connected to the buffer memory and physically disjoint from the primary memory and the buffer memory;
   means for copying data in the buffer memory to appropriate locations in the shadow storage element when the processors complete flushing of their caches, internal registers and queues, thereby establishing a consistent checkpoint in the memory system from which processing can resume without loss of data integrity or program continuity following a fault.

3. A computer system which periodically establishes a consistent checkpoint of a current state of the computer system for supporting fault-tolerant operation, the computer system comprising:
   a processor having a cache, internal registers and an input/output subsystem which provides input/output events for the processor, wherein the processor has means for queuing input/output events between checkpoints;
   a main memory having a primary memory element connected to the processor;
   a buffer memory connected to the primary memory element such that the buffer memory captures data and addresses of write accesses to the primary memory element simultaneously with the write access to the primary memory element;
   a shadow storage element connected to the buffer memory; and
   a memory control logic circuit, connected to the shadow storage element and the buffer memory and having outputs to control the shadow storage element and the buffer memory to copy data from the buffer memory to the shadow storage element in response to instructions from the processor; and
   wherein the processor includes means for suspending operations, means for flushing the cache, internal registers and the queued input/output events to the main memory system and means for instructing the memory control logic to copy data after flushing of the cache, internal registers and queued input/output events has completed.

4. In a computer system having first processor with a first cache, first internal registers and a first queue of input/output events and a second processor with a second cache, second internal registers and a second queue of input/output events, each cache being connected to a main memory and for caching data from the main memory, the main memory comprising a primary memory, a buffer memory connected to the primary memory such that data and addresses of write accesses to the primary memory are captured in the buffer memory simultaneously with the write access to the primary memory, and a shadow storage element connected to the buffer memory, a method for synchronizing flushing of caches, internal registers and queues to maintain a consistent state of the computer system in the main memory, the method comprising the steps, performed by the first processor, of:
   setting a lock and suspending normal operations;
   flushing the first cache, the first internal registers and the first queue to the primary memory such that the buffer memory captures data flushed from the first cache, first internal registers and first queue;
   waiting until the second processor commences flushing of the second cache, second internal registers and a second queue such that the buffer memory captures data flushed from the second cache and second internal registers;
   identifying which processor has written the data in the buffer memory;

instructing the buffer memory to copy data flushed from each processor having completed flushing and captured in the buffer memory to the shadow storage element; and releasing the lock and resuming normal operations.

5. A method for maintaining a consistent state of a computer system in main memory to support fault tolerance in the computer system, wherein the computer system includes a first computer having a first cache, internal registers and queue of input/output events, a second computer having a second cache, internal registers and queue of input/output events, wherein the first and second caches hold data accessed from a primary memory by the first and second computers, and wherein the first and second computers may modify said data in the primary memory, the method including the steps of:

monitoring the primary memory to detect a write of data to the primary memory;

copying the data written to the primary memory into a buffer memory simultaneously with the data written to the primary memory;

periodically flushing data from the first cache, internal registers and queue and the second cache, internal registers and queue into the primary memory in synchronization;

after flushing, copying data from the buffer memory into a shadow storage element.

6. A computer system which periodically establishes a consistent checkpoint of a current state of the computer system for supporting fault-tolerant operation, the computer system comprising:

a processor having a cache, internal registers and an input/output subsystem which provides input/output events for the processor, wherein the processor has means for queuing input/output events between checkpoints:

a main memory system connected to the processor, wherein the processor utilizes data from the main memory system and temporarily stores utilized data in the cache, the main memory system comprising:

a primary memory element having an input through which data in the primary memory element is accessed;

a second memory element connected to the primary memory element so as to enable the second memory element to capture data and addresses of accesses to the primary memory element simultaneously with the write access; and means for ensuring the existence of a consistent checkpoint state in the primary and second memory elements using the data stored in the second memory element; and wherein the processor includes means for suspending operations, means for flushing the cache, internal registers and the queued input/output events to the main memory system and means for instructing the means for ensuring after flushing of the cache, internal registers and queued input/output events has completed.

7. A computer system comprising:

a processor having a cache, internal registers and an input/output subsystem which provides input/output events for the processor, wherein the processor has means for queuing input/output events between checkpoints;

a main memory subsystem, coupled to the processor, including:

a primary memory element accessible by the processor a buffer that monitors write accesses to the primary memory element and stores data related to the write accesses simultaneously with the write access; and means, using the data from the buffer, for ensuring the existence of a consistent checkpoint state in the main memory subsystem to which processing can resume without loss of data integrity and program continuity following a fault; and wherein the processor includes means for suspending operations, means for flushing the cache, internal registers and the queued input/output events to the main memory system and means for instructing the means for ensuring after flushing of the cache, internal registers and queued input/output events has completed.

8. In a computer system having first processor with a first cache and first queue of input/output events and a second processor with a second cache and second queue of input/output events, each cache being connected to a main memory and for caching data from the main memory and having means for maintaining cache coherency between the first and second caches, wherein the main memory comprises a primary memory, a buffer memory connected to the primary memory, and a shadow storage element connected to the buffer memory, a method for synchronizing flushing of the first and second caches to maintain a consistent state in the main memory, the method comprising the steps, performed by the first processor, of:

setting a lock and suspending normal operations;

flushing the first cache and first queue to the main memory such that the buffer memory and the primary memory capture data flushed from the first cache;

synchronizing with the second processor to flush the second cache and second queue to the main memory such that the buffer memory and the primary memory capture data flushed from the second cache;

instructing the buffer memory to copy data captured therein to the shadow storage element; and releasing the lock and resuming normal operations.

9. The method of claim 8, wherein the step of synchronizing comprises the step of waiting until the second processor completes flushing of the second cache and second queue to the main memory such that the buffer memory and the primary memory capture data flushed from the second cache and second queue.

10. The method of claim 8, wherein each cache is connected to a main memory such that the main memory can identify the processor which accesses the main memory, and wherein the step of synchronizing includes the step of waiting until the second processor commences flushing of the second cache and second queue to the main memory such that the buffer memory and the primary memory capture data flushed from the second cache and second queue and wherein the buffer memory identifies which processor has written the data in the buffer memory, and copies only data flushed from each processor having completed flushing and captured in the buffer memory to the shadow storage element.

11. The method of claim 8, wherein the first and second processors each have first and second sets of internal registers, respectively, and wherein the first processor flushes the first set of internal registers when the first cache and first queue are flushed and wherein the second processor flushes the second set of internal registers when the second cache and second queue are flushed.

12. The method of claim 8, wherein the first and second processors each have a flush counter which is incremented when a flush operation is completed.

13. A computer system comprising:
- a first processor with a first cache and first queue of input/output events, and a second processor with a second cache and second queue of input/output events and having means for maintaining cache coherency between the first and second caches;
- a main memory connected to the first and second processors and caches and first and second queues and comprising a primary memory, a buffer memory connected to the primary memory, and a shadow storage element connected to the buffer memory; and
- means for synchronizing flushing of the first and second caches and first and second queues to maintain a consistent state in the main memory, including:
- means for setting a lock and suspending normal operations;
- means for flushing the first cache and first queue to the main memory such that the buffer memory and the primary memory capture data flushed from the first cache and first queue;
- means for synchronizing with the second processor to flush the second cache and second queue to the main memory such that the buffer memory and the primary memory capture data flushed from the second cache and second queue;
- means for instructing the buffer memory to copy data captured therein to the shadow storage element; and
- means for releasing the lock and resuming normal operations.

14. The computer system of claim 13, wherein the means for synchronizing comprises means for waiting until the second processor completes flushing of the second cache and second queue to the main memory such that the buffer memory and the primary memory capture data flushed from the second cache and second queue.

15. The computer system of claim 13, wherein each cache is connected to a main memory such that the main memory can identify the processor which accesses the main memory, and wherein the means for synchronizing includes means for waiting until the second processor commences flushing of the second cache and second queue to the main memory such that the buffer memory and the primary memory capture data flushed from the second cache and second queue and wherein the buffer memory identifies which processor has written the data in the buffer memory, and copies only data flushed from each processor having completed flushing and captured in the buffer memory to the shadow storage element.

16. The computer system of claim 13, wherein the first and second processors each have first and second sets of internal registers, respectively, and wherein the first processor flushes the first set of internal registers when the first cache and first queue are flushed and wherein the second processor flushes the second set of internal registers when the second cache and second queue are flushed.

17. The computer system of claim 13, wherein the first and second processors each have a flush counter which is incremented when a flush operation is completed.

18. A computer system which periodically establishes a consistent checkpoint of a current state of the computer system for supporting fault-tolerant operation, the computer system comprising:
- a processor having a cache, internal registers and an input/output subsystem which provides input/output events for the processor, wherein the processor has means for queuing input/output events between checkpoints;
- a main memory connected to the processor and comprising:
  - a primary memory element having an input through which data in the primary memory element is accessed;
  - a second memory element connected to the primary memory element so as to enable the second memory element to capture data and addresses of write accesses to the primary memory element simultaneous with the write access to the primary memory element; and
  - a memory control logic circuit, connected to the second memory element for controlling the primary and second memory elements to maintain the existence of a consistent checkpoint state in the primary and second memory elements using the data stored in the second memory element in a manner transparent to the processor; and
- wherein the processor includes means for suspending operations, means for flushing the cache, internal registers and the queued input/output events to the main memory system and means for instructing the memory control logic to establish a consistent checkpoint state after flushing of the cache, internal registers and queued input/output events has completed.

19. The main memory of claim 18, wherein the second memory element includes a buffer memory connected to capture data and addresses of write accesses to the primary memory element and a shadow storage element connected to the buffer memory and wherein the memory control logic circuit copies data from the buffer memory to the shadow storage element in response to an instruction from the processor.

20. The main memory of claim 18, wherein the processor includes a cache, internal registers and a queue of input/output events and means for periodically flushing the cache, the internal registers and the queue to the main memory.

* * * * *